US006988363B2

(12) United States Patent
Bitter

(10) Patent No.: US 6,988,363 B2
(45) Date of Patent: Jan. 24, 2006

(54) HYDRAULIC ACTIVE BOOM SUSPENSION FOR A TELEHANDLER

(75) Inventor: Marcus Bitter, Contwig (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/884,716

(22) Filed: Jul. 2, 2004

(65) Prior Publication Data

US 2005/0011190 A1 Jan. 20, 2005

(30) Foreign Application Priority Data

Jul. 5, 2003 (DE) ................................ 103 30 344
Sep. 22, 2003 (DE) ................................ 103 43 742

(51) Int. Cl.
*F16D 31/02* (2006.01)

(52) U.S. Cl. ............................ 60/468; 60/469; 91/420

(58) Field of Classification Search ...................... 91/1, 91/361, 420; 92/5 R; 60/338, 396, 459, 60/468, 469, 461, 462, 463
See application file for complete search history.

(56) References Cited

U.S. PATENT DOCUMENTS 4,643,074 A * 2/1987 Gunda et al. ................. 91/361
4,953,723 A * 9/1990 Saotome et al. .............. 60/469
4,995,517 A * 2/1991 Saotome ...................... 91/437
5,048,296 A * 9/1991 Sunamura et al. ............ 60/468
5,622,226 A * 4/1997 Hausman et al. ............ 172/4.5
5,666,806 A * 9/1997 Dietz .......................... 60/327
5,890,870 A * 4/1999 Berger et al. ................. 60/469

FOREIGN PATENT DOCUMENTS

DE 41 05 459 2/1991
DE 41 29 509 9/1991
DE 42 21 943 A1 7/1992
DE 42 31 399 9/1992
DE 42 21 943 3/1993
DE 44 02 580 1/1994
DE 697 11 665 9/1997
DE 100 06 908 2/2000
DE 100 06 908 A1 2/2000
DE 100 46 546 A1 9/2000
DE 100 06 908 8/2001
DE 100 46 546 3/2002
EP 0 816 576 1/1998
EP 1 126 088 2/2001
JP 08-0 12 546 1/1996

* cited by examiner

*Primary Examiner*—Edward K. Look

*Assistant Examiner*—Igor Kershteyn

(57) ABSTRACT

A suspension for the boom of a loading vehicle includes a hydraulic cylinder for raising and lowering, or for extending and retracting (in the case of a telescopic cylinder), a boom. A direction control valve is provided for selectively routing hydraulic oil to and from at least a head-end chamber of the cylinder. A position sensor senses the position of the hydraulic piston rod, at the start of operation, and sends a sends a target signal representing this beginning position to a control unit which determines the difference between the target signal and a signal representing a current position of the piston rod. When this difference equals a preset difference threshold, a pressure-limiting unit, in the form of a valve or choke, is activated so as to control fluid flow to and from the head-end chamber so as to return the piston rod to its initial position which generated the target signal. Different embodiments have different valve component arrangements for influencing the reaction time of the suspension and/or for adapting the circuitry for use with single-acting, double-acting or telescopic boom cylinders.

13 Claims, 6 Drawing Sheets

HYDRAULIC ACTIVE BOOM SUSPENSION FOR A TELEHANDLER

FIELD OF THE INVENTION

A hydraulic suspension, especially for a boom of a loading vehicle, with at least one hydraulic cylinder, which has at least one chamber, a control valve that is connected by at least one hydraulic line to the chamber(s) and that optionally produces a connection to a hydraulic oil pump and a hydraulic-oil tank, and a connecting line.

BACKGROUND OF THE INVENTION

According to the present state of the art, tractors with front loaders, such as wheel loaders, telescope loaders, crane vehicles, and similar land vehicles are provided with suspension/shock-absorbing systems that consist of one or more gas-filled hydraulic-storage units, which are connected as needed to a hydraulic stroke cylinder of one of the booms, in order to reduce the effects of vibrations of the boom on the chassis of the vehicle and vice versa. In this connection, we speak of "passive" suspension systems. They have the disadvantage that they are based, as a rule, on a constant suspension characteristic and thus their suspension characteristics do not react in a variable manner to the load acting on the stroke cylinder or the boom. A suspension that acts variably depending on the load can be achieved using hydraulic-storage units only by means of expensive nozzles and valve systems.

An example of such a passive suspension system is disclosed in DE 42 21 943 C2. In it, a hydraulic system for a drivable working machine with working devices is recommended with a load-suspension system consisting of at least one hydraulic-storage unit. In order to balance the load pressure of the hydraulic-storage unit on the load pressure of a stroke cylinder at all times, at least one nozzle is envisioned in connection with several path valves between the load-suspension system and the stroke cylinder. This system is expensive and takes up space.

"Active" vibration dampers have been known for some years from rear power lifters on agricultural tractors. These "active" damping systems measure the loads that are affecting the vehicle because of vibrations and shifts the loads according to the stroke cylinder of a power lifter in such a way that the stimulating vibrations are counteracted, which weakens the stimulating vibrations. Since the power lifter of the hydraulic system is lifted and lowered actively, depending on the load condition, we speak of an "active" elimination of vibrations.

An "active" vibration-damping system is disclosed in DE 100 46 546 A1. In it, a large manipulator is recommended with a vibration damper that has means for damping mechanical vibrations in a concrete-pumping system in a folding boom of a concrete pumping system. The vibration damper charges the pressures in the individual hydraulic cylinders of the folding boom of the concrete-pumping system in such a way that the end piece, out of which the liquid concrete flows, stays in its position relatively calmly. This vibration-damping system is very expensive, since each hydraulic cylinder must be provided with two pressure sensors and each folding link with an angle of rotation sensor. In addition, a very complex control algorithm is used, which is unsuitable for the active suspension of a boom of a loading vehicle.

DE 100 06 908 A1 discloses an agricultural working machine that is connected on its front to a telescoping boom.

The boom is raised or lowered by a hydraulic piston-cylinder unit. To realize a pre-selectable force to be applied to a moving device taken up by a boom, a hydraulic circuit is recommended that has a seat valve that can be blocked and an adjustable pressure-control valve, so that a uniform pressure is maintained in a cylinder space on the piston side and the same force is always applied to the bottom, specifically, regardless of whether bottom is even or uneven. It has the disadvantage that the recommended hydraulic circuit is set only to a pressure limit that can be set in advance and thus is not suitable in form for an active suspension system.

The task on which the invention is based is seen as providing a hydraulic suspension of the type mentioned by which the problems mentioned above can be overcome. In particular, an active suspension is created that reacts variably to the load conditions of a boom of a loading vehicle.

SUMMARY OF THE INVENTION

According to the present invention, there is provided an improved suspension for the boom of a loader, in particular, a telehandler.

An object of the invention is to provide a loader boom arrangement having a hydraulic suspension, of the type mentioned in the background, that contains a control unit and a sensor giving the position of the hydraulic cylinders and in which the connecting line has a pressure-limiting unit that can be adjusted depending on the sensor signal. This hydraulic cylinder can involve a double-acting or even a single-acting hydraulic cylinder.

The suspension system according to the invention can be also used, for example, in a telescopic cylinder, the individual telescopic segments of which enclose a chamber to which pressure can be applied. By applying pressure to this chamber, the telescopic segments of the hydraulic cylinder can be run individually. By means of the control of the pressure limiting depending on the sensor signal according to the invention, the pressure in the chamber or chambers of the hydraulic cylinder is regulated in such a way that by pushing the hydraulic piston from an original position, the extending motion is damped by the controlled pressure limiting and the hydraulic piston is moved back to its original position. With this, a suspension system is created that can react to the extension of the boom independent of the load. Regardless of the height of a load being carried on the boom, it can react actively to, and in a manner optimized to, the extension movements of the boom, caused by dynamic forces (e.g., impacts or acceleration forces).

In a preferred embodiment of the invention, the connecting line connects the chamber(s) to a hydraulic oil tank. This is especially appropriate when a single-acting hydraulic cylinder is involved. The hydraulic line(s) that connect the chamber(s) to the control valve represent a single-acting hydraulic cylinder, a hydraulic line on the discharge side. If the pressure in the pressure chamber of a single-acting hydraulic cylinder is increased, caused, for example, by an impact or striking movement of the hydraulic piston, the hydraulic piston pressure in the connecting line increases in such a way that the adjustable pressure-limiting unit opens and excess hydraulic oil can flow into the hydraulic oil tank and the hydraulic piston can be moved in or released. At the same time, a sensor signal is recorded by the control unit that leads to a changed pressure limiting in the adjustable pressure-limiting unit, so that the pressure-limiting unit closes again and allows the hydraulic piston to be raised again by hydraulic oil flowing from the hydraulic oil pump.

In another especially preferred embodiment of the invention, the hydraulic cylinder has a chamber on the discharge side and one on the suction side. In a hydraulic cylinder of this kind, the two chambers are connected together through the connecting line. In addition, each chamber here has a hydraulic line connected to the control valve. In this case, the control valve is constructed in such a way that one of the hydraulic lines is connected to the hydraulic-oil tank when a hydraulic oil flow is taking place from the side of the hydraulic oil pump into the other chamber. In case of a pressure increase in one of the chambers of a double-acting hydraulic cylinder, caused, for example, by an impact or striking movement of the hydraulic piston, the hydraulic oil pressure rises the connecting line in such a way that the adjustable pressure-liming unit opens and excess hydraulic oil flows into the hydraulic-oil tank or into the corresponding other chamber and the hydraulic piston can be driven in or out or can spring in our out. At the same time, a sensor signal is recorded by the control unit, which leads to a changed pressure limiting in the adjustable pressure-limiting unit, so that the pressure-limiting unit closes again and allows hydraulic oil flowing from then hydraulic oil pump to raise or lower the hydraulic piston.

In an especially preferred embodiment of the invention, the connecting line contains a first check valve, with which the hydraulic suspension can open and close or be activated and deactivated. If the first check valve opens and the control valve is connected in a stroke position, then a constant circulating volume current is set up, that starts from the hydraulic oil pump, flows through the control valve, through the line on the discharge side to the chamber on the discharge side, through the connecting line, through the pressure-limiting unit, and through the check valve to the chamber on the suction side and through the line on the suction side through the control valve into the tank. Similarly, a hydraulic cylinder working one side sets up a constant circulating volume current that flows from the hydraulic oil pump through the control valve, through the hydraulic line, into the chamber and through the connecting line through the pressure-liming unit and through the check valve into the tank. The sensor delivers at the start a position signal for the hydraulic piston, which is recorded by the control unit as a guiding parameter (target value) to be maintained. If the position of the hydraulic piston now changes because of a position change of the boom (the boom is raised or lowered by an outside force), then the pressure-limiting unit is controlled or regulated on the basis of a control signal generated by the control unit, depending on the currently received sensor signal (actual value). By the pressure being increased or reduced by the pressure-limiting unit, the pressure in the chamber or chambers changes of the hydraulic cylinder in such a way that the position of the hydraulic piston is changed, until the original position of the hydraulic piston is restored or the difference between the sensor signal and the guiding parameter is equal to zero or below a threshold value that can be set in advance. The dynamics set up in the control process lead to a damping of the motion of the hydraulic piston through a pressure increase that counteracts the movement. If the first check valve is closed, the no more hydraulic oil can circulate, whereby a pressure builds up in the changer on the discharge side or in the chamber of the single-acting hydraulic cylinder, which allows the hydraulic piston to rise. Similarly, in the double-acting hydraulic cylinder, a pressure builds up in the changer on the suction side when the first check valve is closed when the control valve is connected in a drop position.

In another preferred embodiment of the invention, the connecting line, advantageously in double-acting hydraulic cylinders, contains a non-return valve that closes the connecting line in the direction of the non-return valve that closes the chamber on the discharge side. The non-return valve can be required when, e.g., no check valve is contained in the connecting line. Since individual pressure-limiting units, for example chokes or diaphragms can be passed through in both directions and other pressure-limiting units can be sealed without leaks in only one direction, this can be assured by a non-return valve, so that no oil supply can take place into the connecting line from the chamber on the suction side to the chamber on the discharge side.

In another preferred embodiment of the invention, the pressure-limiting unit is a pressure-limiting valve that can be regulated, preferably adjusted electrically. When a limit pressure is reached on the discharge side of the hydraulic system, which is given in advance by the control setting of the adjustable pressure-limiting valve, the pressure-limiting valve opens, so that the pressure on the discharge side of the hydraulic system can drop. As soon as the limit value is exceeded, the pressure-limiting valve closes again, so that the pressure on the discharge side of the hydraulic system can rise again. Through appropriate control settings of the pressure-limiting valve, the limit pressure can be varied or regulated by the control unit and thus the position of the hydraulic piston is changed.

In another preferred embodiment of the invention, the pressure-limiting unit is an adjustable or controllable choke. In an adjustable or controllable choke, similar to the opening and closing of the pressure-limiting valve, the pass-through cross-section of the choke is enlarged or reduced by the control unit. In consequence of this regulation, the pressure on the discharge side of the hydraulic system falls or the pressure rises, so that the position of the hydraulic piston can be changed. As adjustable chokes, a diaphragm, an adjustable current-control valve, or another controllable or adjustable means can be envisioned, for example, to control the flow-through cross-section.

In another preferred embodiment of the invention, the control valve has a closed position. In the closed position, with the first check valve closed, the hydraulic piston is held in his position. With the first check valve open for a double-acting hydraulic cylinder, a floating position is realized, in which the hydraulic piston can be changed in its position by outside forces or the boom can be lowered or raised by a force acting on the hydraulic piston.

In another preferred embodiment of the invention, a load-holding valve is arranged in the line on the discharge side. The load-holding valve provides a safety function and assures a controllable lowering of the boom in case of an emergency, e.g. a pipe break in the line on the discharge side.

In another especially preferred embodiment of the invention, a pressure-limiting line provided with a pressure-limiting valve and connected to the tank is provided between a hydraulic pump and control valve. With a closed control valve, it is thereby assured that with secondary hydraulic pumps, the hydraulic oil is directed into the tank and circulation of the hydraulic oil is maintained. The pressure-oil can be supplied, for example, through a constant pump, whereby pressure limitation is assured by the pressure-limiting line and the pressure-liming valve. Instead of a pressure-oil supply by a constant pump, however, pressure-oil supply can also be envisioned by means of an adjustable pump that is controlled within the framework of a hydraulic load-sense system.

In another preferred embodiment of the invention, the control unit regulates the adjustable pressure-limiting unit as a function of a difference signal resulting from the variable sensor signal and a target-value signal, whereby the target-value signal corresponds to the sensor signal when the hydraulic suspension is activated and the difference signal reaches a threshold value set in advance. By opening the first check valve, when the control valve is not closed, the suspension is activated and the guiding parameter or the target value is determined by means of the signal delivered by the sensor. By changing the position of the hydraulic piston, a difference value is determined with respect to the target value by means of the sensor signal (actual value), which is captured continually. This threshold value can also be zero, which would mean that the control takes place already in case of the smallest deviation between target value and actual value.

If a control valve is activated by the operator with an active suspension and a change in the position of the hydraulic piston is thereby effected, this is also signaled to the control unit. The new position of the hydraulic piston is then applied as a measurement quantity for the new target value to generate the control signal. In this way, it is assured that even with an activated suspension, it is possible to move the hydraulic piston in and out or that a signal is sent to the control unit when the control valve is activated in case of an activated suspension, by means of which signal a movement of the boom can be taken into account, so that a "new" target value is established when a desired movement of the boom takes place with activated suspension.

In another preferred embodiment of the invention, especially for double-acting hydraulic cylinders, a second line with a second check valve is contained on the suction side, which connects the chamber on the suction side to the tank. This embodiment of the invention represents a needs-controlled hydraulic suspension, since in this case the control valve is in a closed position and is only opened in case of need. The hydraulic suspension is active when the first and second check valves are open. In addition, the adjustable pressure-limiting valve is used as an adjustable pressure-limiting unit. If a change in position of the hydraulic piston now appears in such a way that the hydraulic piston drops, hydraulic oil can flow out through the second line on the suction side to the tank. At the same time, a control signal is generated by the control unit, whereupon the control valve is opened and hydraulic oil can flow to hydraulic piston. As soon as the original position is reached again, the control unit sends a signal to close the control valve.

In another advantageous embodiment of the invention, the hydraulic cylinder contains means for measuring load, in particular a pressure sensor. A load measurement, for example through a pressure sensor arranged at the hydraulic piston, makes it possible to use an adjustable choke instead of the adjustable pressure-limiting valve in a needs-controlled suspension. The load measurement may be required in order that no hydraulic oil can leak through the first and second check valve and only when a preset limit pressure is reached are the first and second check valves opened in one of the two chambers. A limit pressure of this kind is reached when, for example, an impact affects the boom and the hydraulic piston should spring in our out. The load-measuring device sends a limit-pressure signal to the control unit, whereupon the check valve is opened. In consequence of this, the hydraulic piston is lowered or raised in the direction of the impact, whereupon the control unit generates a control signal, the adjustable choke is controlled, and the control valve opens, so that hydraulic oil can flow and the hydraulic piston resumes its original position. When the original position is reached, the check valve and the control valve are closed.

A hydraulic suspension according to the invention can be especially advantageous in various types of boom vehicles such as, e.g., wheel loaders, backhoe loaders, telescope loaders, skid-steer loaders, or also in tractors with front loaders, etc. Other possibilities are offered, e.g., in mowing tables of harvesting machines, and in mowing threshers and chaff cutters.

In addition, it turns out to be advantageous that a hydraulic suspension of this kind to be used in connection with hydraulic cylinders that are made with so-called load-holding valves, without the function of the load-holding valve being disabled. In this way, existing safety standards can be maintained.

In addition, normal control valves already present on the vehicle to provide volume current (raising and lowering the boom) can be used. Normal control valves have a certain positive overlap, in order to seal the valve sliders against leaks. Valves of this kind can often not be used in stationary hydraulics in the realization of control system, since the positive overlap leads to dead times when control is changed from working connection A to B, which can make construction of a control algorithm considerably more difficult or even prevent it. For this reason, a so-called servo-valve is usually used in stationary hydraulics, which has little or no overlapping and is very expensive and subject to disturbances.

Since fewer parts or components are required than with passive suspension system, a hydraulic system according to the invention can be constructed cost-favorably and from traditional components, without having to rely on developing special valves.

The construction space for an active suspension system according to the invention is significantly smaller than with passive suspension systems, since, for example, no voluminous hydraulic-storage units are needed.

BRIEF DESCRIPTION OF THE DRAWINGS

The invention and additional advantages and advantageous further developments of the invention will be described and explained in more detail in the following with reference to the drawings, which show several embodiment examples of the invention.

DESCRIPTION OF THE PREFERRED EMBODIMENT

Figure 1:
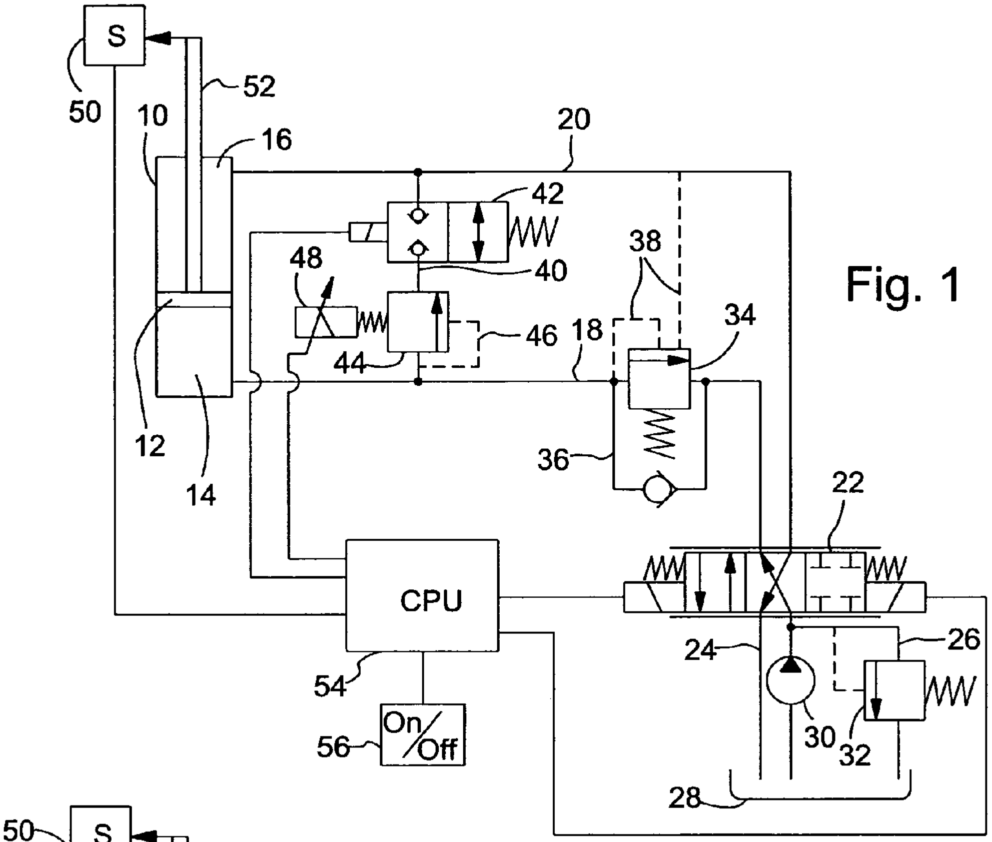
FIG. 1 shows a hydraulic circuit plan according to the invention, with a constantly circulating volume current and a controllable pressure-limiting valve.

FIG. 1 shows a hydraulic cylinder 10 with a hydraulic piston 12, which serves to raise and lower the boom of a loading vehicle (both not shown). The head-end of the hydraulic cylinder 10 has a chamber 14, and the rod-end of the cylinder 10 has a chamber 16, with supply/return lines 18 and 20 respectively coupling the chambers 14 and 16 to a solenoid-operated, direction control valve 22. Control valve 22 is connected through an outflow line 24 and through a pressure-limiting line 26 to a hydraulic-oil tank 28. A hydraulic oil pump 30 supplies hydraulic oil through the control valve 22 to each hydraulic line 18, 20.

Control valve 22 can be switched among three positions, namely, a closed position, in which no flow takes place through the hydraulic lines 18 and 20, a stroke position, in which hydraulic line 18 is supplied with hydraulic oil and hydraulic line 20 is coupled to the hydraulic tank 28, and a drop position, in which hydraulic line 20 is supplied with hydraulic oil and hydraulic line 18 is connected to the hydraulic tank 28.

The pressure-limiting line 26 contains a pressure-limiting valve 32, which opens when a limit pressure is reached and makes possible a flow through the hydraulic-oil pump 30 to the hydraulic-oil tank 28. The hydraulic-oil pump 30 can supply hydraulic oil in this way even when control valve 22 is closed.

Hydraulic line 18 contains a load-holding valve 34, which permits a flow of hydraulic oil through a bypass line 36 in the direction of the hydraulic cylinder 10. Through control line 38, the load-holding valve is opened in the direction of the hydraulic-oil tank 28 in case of an overload, so that a flow of hydraulic oil to the hydraulic-oil tank 28 can take place.

Between the hydraulic lines 18 and 20, a connecting line 40 is arranged, which contains a first solenoid-operated check valve 42. The first check valve 42 is moveable between a closed position, in which no flow-through takes place in either direction, and an open position, in which a flow-through is possible in either position. In addition, connecting line 40 contains a controllable pressure-limiting valve 44, which opens through a control line 46 in the direction of hydraulic line 20. The control pressure to open the pressure-limiting valve can be regulated by a regulator 48.

In addition, a position sensor 50 is connected to a piston rod 52 of the hydraulic cylinder 10 and provides a sensor signal that transmits the position of the hydraulic piston 12 to a control unit 54. Control unit 54 is connected to a switching device 56, through which the control unit 54 and thereby the hydraulic suspension can be activated.

According to FIG. 1, the hydraulically active suspension is realized with a constantly flowing volume current. For this, the control unit 54 is activated through the switching device 56, whereby the control unit 54 opens the first check valve 42 and switches control valve 22 to the stroke position. The hydraulic oil pump 20 supplies hydraulic oil through control valve 22 and through the load-holding valve 34 to the hydraulic cylinder 10 of the boom. There, a certain pressure builds up, which is set by means of the adjustable pressure-limiting valve 44. As soon as a pressure balance has been established, the hydraulic piston 12 assumes a certain position, whereby excess hydraulic oil supplied by the hydraulic-oil pump flows through the pressure-limiting valve 44 and through the first check valve 42 to the hydraulic oil tank 28.

The basic working principle consists of controlling the pressure on the discharge side of the hydraulic cylinder 10 are controlled by the fact that a certain flow of hydraulic oil to the discharge side and flow out to the hydraulic tank 28 again in a controlled manner. The pressure is generated in such a way that the hydraulic oil can flow to the hydraulic tank 28 only against a certain resistance, which is given in advance by the pressure-limiting valve 44, whereby this pressure is so high that it can counteract a load that affects the hydraulic cylinder 10.

In order for the volume current to be able to flow, check valve 42 must be switched to its open position. If this is not the case, a pressure builds up on the head-end of the hydraulic cylinder 10 and thereby in the chamber 14, which allows the piston rod 52 to be driven out and thus the boom to rise.

Through the controllable pressure-limiting valve 44, the pressure that is to prevail at the head-end of the hydraulic cylinder 20 can be set according to need by control unit 54.

The position of the boom or the position of the piston rod 52 and the hydraulic piston 12 are measured constantly by the position sensor 50 and serves as a regulating parameter (actual value) for setting the pressure in the head-end of the hydraulic cylinder 10. This position can be measured in various ways. One possibility is shown in FIG. 1, in which the position of the piston rod 52 is captured. Also suitable would be the angle of the boom.

When the control unit 54 is activated, the regulator 48 is activated and the original position of the boom is maintained as a guiding parameter (target value) to be kept. The control unit 54 determined, through an integrated processor (not shown), from the guiding parameter and the currently measured control quantity (actual value) the deviation (control difference) from each other, in order for this basic value to perform the setting of the pressure-limiting valve 44 by means of a setting parameter.

If the control unit 54 determines that the boom has dropped too low, the pressure-limiting valve 44 is set to a higher value, so that the pressure in the head-end of the hydraulic cylinder 10 is increased and the hydraulic piston rod 52 is driven out.

If the control unit 54 determines that the boom has been raised too high, the pressure-limiting valve 44 is turned down to a lower value, so that the pressure in the head-end of the hydraulic cylinder is reduced and the hydraulic piston rod 52 is retracted.

If, for example, accelerations (impacts and vibrations) occur because of uneven terrain that affect the vehicle, these accelerations are transmitted to the boom because of its ability to bear loads. The acceleration generates a force, through the mass of the boom, that is transmitted as a disturbing quantity to the hydraulic cylinder 10 and thus draws or releases hydraulic oil from/to the head-end of the hydraulic cylinder 10.

In case of an impact that allows the hydraulic piston 12 to be driven toward the head-end of the cylinder 10, oil is forced out of the head-end of the hydraulic cylinder 10 by the hydraulic piston 12 and flows out through the pressure-limiting valve 44. Because of the hydraulic oil volume forced out of the cylinder 10, the boom is lowered, which is recognized in turn by the control unit 54 as a control difference, whereupon the control unit increases the opening pressure of the pressure-limiting valve 44, since the control unit 54 determines the set value according to the control difference. Because of the increase in the opening pressure and the constantly flowing volume current flowing from control valve 22, the boom is lifted again, until the control difference has been reduced to zero or to a threshold value that can be set in advance.

In case of an impact that allows the hydraulic piston rod 52 to be driven out, hydraulic oil is driven out the rod-end of the hydraulic cylinder 10 by the movement of the hydraulic piston 12 and a volume increase occurs in the chamber at the head-end of the hydraulic cylinder 10. The constantly flowing volume flow from control valve 22 fills this volume enlargement up, so that the hydraulic cylinder 10 can be driven out without the danger of generating a vacuum. At the same time, a control difference is recognized by the control unit 54, whereupon the control unit 54 reduces the opening pressure of the pressure-limiting valve 44, during which the control unit 54 determines the corresponding set quantity according to the control difference. Because of the reduction of the opening pressure, hydraulic oil flows out from the head-end of the hydraulic cylinder 10 through the pressure-limiting valve 44 and the boom drops until the control difference is reduced to zero or to a threshold value that can be set in advance.

It is possible, in order to speed up or slow down the reduction in the control difference, for the cross-section of the opening of control valve 22 to be changed in a variable manner according to current needs, so that more volume current can flow to the hydraulic cylinder 10. In extreme cases, a reverse of the volume-current flow device can also be envisioned, in order to be able to retract the hydraulic piston rod 52 faster.

Control valve 22 can be activated electrically, pneumatically, or in another way. It can likewise be envisioned that the controllable pressure-limiting valve 44 can be controlled pneumatically or hydraulically and not electrically as shown in FIG. 1. This can be advantageous at high pressures and/or high volume currents, since then very high forces must be applied by the setting mechanism.

Figure 2:
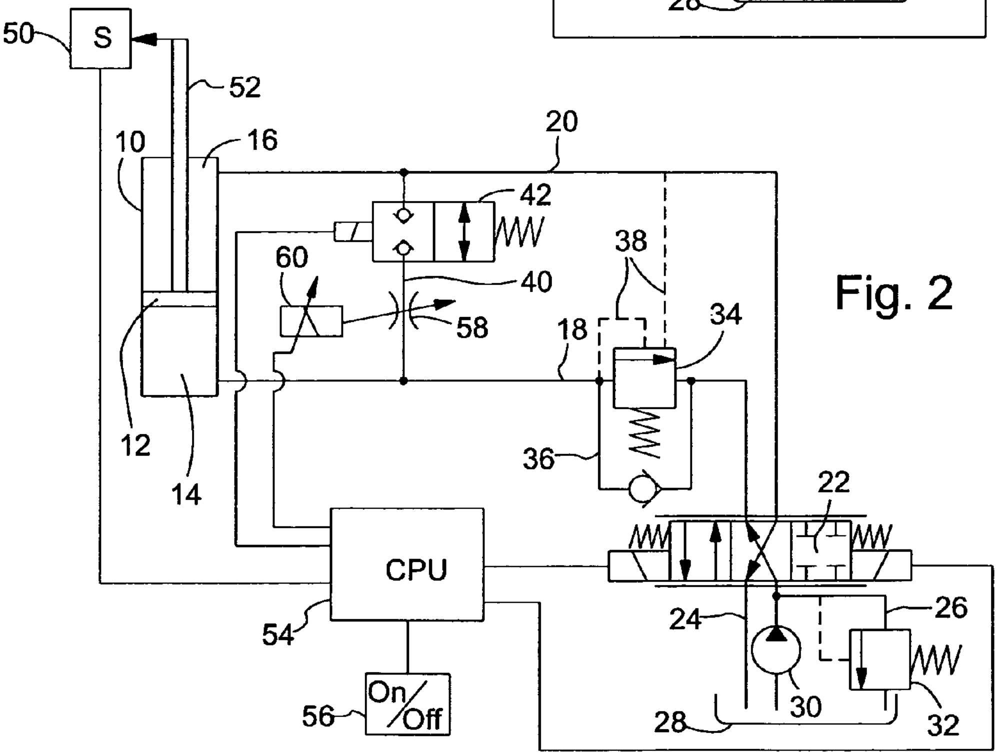
FIG. 2 shows a hydraulic circuit plan according to the invention, with a constantly circulating volume current and an adjustable choke.

Instead of the electrically controllable pressure-limiting valve 44, an electrically controlled choke 58, as also shown in FIG. 2, can be used. The basic working principle is still maintained thereby, however.

The hydraulic oil flowing through the line on the discharge side flows constantly out through the choke 58 to the hydraulic tank 28 when the check valve 42 is open. According to the choke equation, a certain pressure drop is established through the choke 58, which depends on the volume current and the cross-section of the opening of the choke 58, so that a certain stagnation pressure arises on the head-end of the hydraulic cylinder 10, which prevents the boom from collapsing.

The height of the stagnation pressure can be changed by means of the volume current from control valve 22 or through the controllable cross-section of the opening of the choke 58.

The position of the boom is likewise measured constantly and serves as a control quantity (actual value) for setting the stagnation pressure on the discharge side of the hydraulic cylinder 10. This position can likewise be measured in various ways. It would be conceivable, as shown in FIG. 2, to use the position of the piston rod 52 or even the stroke angle of the boom.

If the control is activated, the control unit 54 generates, similar to the example in FIG. 1, a set quantity with which the cross-section of the opening of the choke 58 is controlled by a choke regulator 60 and/or a change in the volume current is evoked by control valve 22.

If the control unit 54 determines that the boom has dropped too low, the cross-section of the opening of the choke 58 is set to a smaller value, so that the stagnation pressure on the stroke side of the hydraulic cylinder 10 is increased and the hydraulic piston rod 52 is driven out. Likewise, in this case, the volume current from control valve 22 can be increased, either alone or simultaneously, in order to increase the stagnation pressure.

If the control unit 54 determines that the boom has been raised too high, the cross-section of the opening of the choke 58 is set to a higher value, so that the stagnation pressure on the discharge side of the hydraulic cylinder 10 is reduced and the hydraulic piston rod 52 is retracted. Likewise, in this scale, the volume current from control valve 22 can be reduced, either alone or simultaneously, in order to reduce the stagnation pressure.

In case of an impact that allows the hydraulic cylinder rod 52 to be retracted, the hydraulic oil at the head-end of the hydraulic cylinder 10 is compressed by the hydraulic piston 12 and the stagnation pressure before the choke 58 is increased. Through the increase in the stagnation pressure, the pressure drop through the choke 58 is likewise increased to that a higher volume current flows through the choke 58. At the same time, the boom drops, which is recognized by the control unit 54 as a control difference, whereupon the control unit 54 reduces the cross-section of the opening of the choke 58, during which the control unit 54 determines the control difference according to the corresponding set quantity. Because of this reduction of the cross-section opening of the choke 58, an increase in the stagnation pressure occurs, whereby the boom is lifted up again until the control difference is again zero or has been reduced to a threshold value that can be set in advance.

In case of an impact that allows the hydraulic cylinder rod 52 to be driven out, the hydraulic oil is forced from the rod-end of the hydraulic cylinder 10 by the hydraulic piston 12 and a volume enlargement occurs in the chamber 14 on the stroke side. The constantly flowing volume current from control valve 22 fills the volume enlargement up without a danger of generating a vacuum. Because the hydraulic cylinder rod 52 is driven out, the boom rises, which is recognized by the control unit 54 as a control difference, whereupon the control unit 54 enlarges the cross-section of the opening of the choke 58, during which the control unit 54 determines the control difference according to the corresponding set quantity. Because of this reduction in the stagnation pressure, more hydraulic oil can flow out from the discharge side of the hydraulic cylinder 10 through the choke 58 than the volume current that can flow through the from control valve 22. The boom drops until the control difference is again zero or has been reduced to a threshold value that can be set in advance.

It is also conceivable here that in an extreme case the volume current can be set to the opposite direction, in order to be able to drive the piston in faster. In addition, the electrically controllable choke 58, as well as the first check valve 42 or control valve 22, can be driven pneumatically or electrically.

Figure 3:
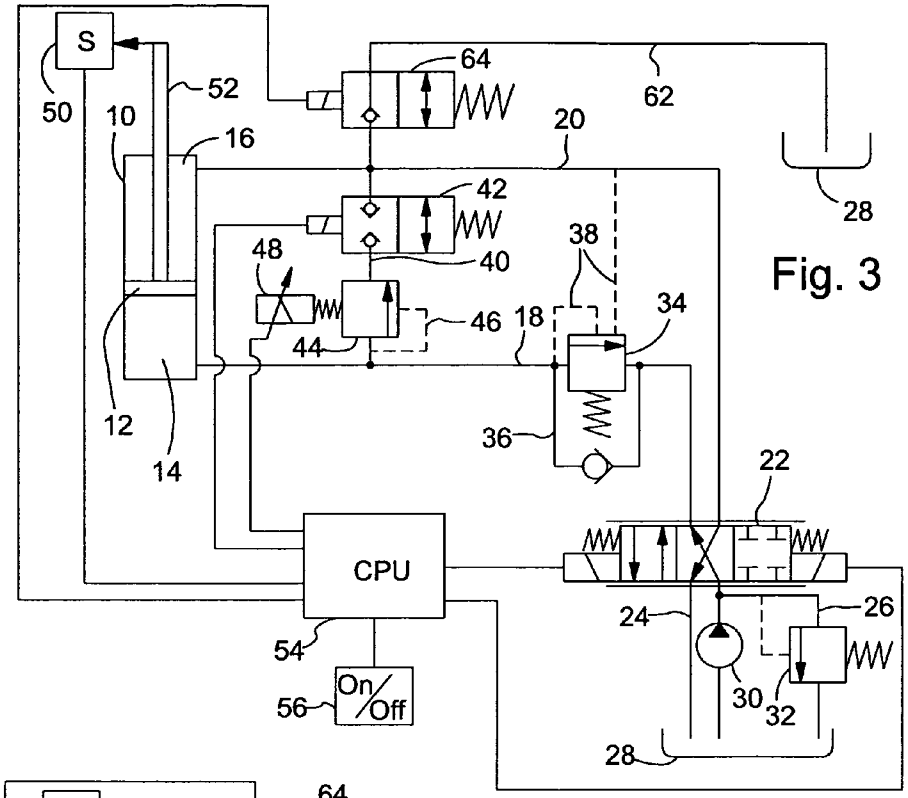
FIG. 3 shows a hydraulic circuit plan according to the invention, with a volume current that flows as needed and a controllable pressure-limiting valve.
Figure 4:
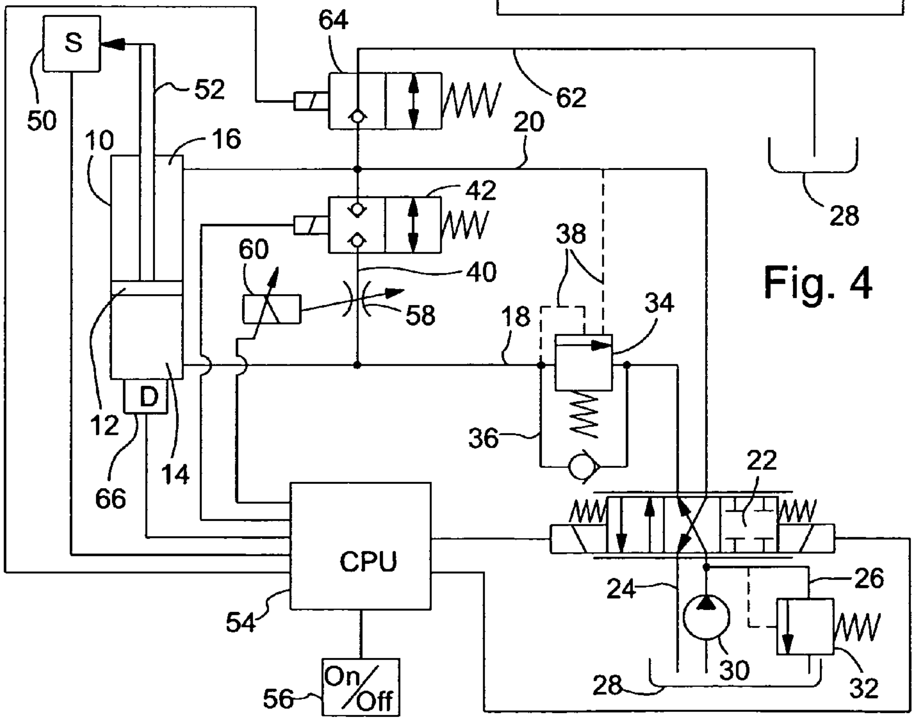
FIG. 4 shows a hydraulic circuit plan according to the invention, with a volume current that flows as needed and an adjustable choke.

In further embodiment examples, such as those shown in FIGS. 3 and 4, for example, a second line 62 is provided for communication with the rod-end of the hydraulic cylinder 10, which leads from the first line 20 to the hydraulic tank 28 and is provided with a second check valve 64, whereby the first and second check valves 42, 64 can be constructed identically.

The embodiment examples shown in FIGS. 3 and 4 involve needs-controlled suspension systems in which, in contrast to the embodiment examples shown in FIGS. 1 and 2, a volume current flows from control valve 22 through a load-holding valve 34 to the hydraulic cylinder 10 of the boom. Control valve 22 is thus in the closed position and is switched by the control unit 54 to the corresponding other position only when needed.

FIG. 3 shows a needs-controlled hydraulic suspension with the electrically controlled pressure-limiting valve 44, as can also be seen in FIG. 1. If the control is activated by the control unit 56, the original position of the boom is kept as a guide parameter (target value) and the control unit determines from this guide parameter and the current, measured position (control quantity) the deviation (control difference) from each other, in order, on this basis, to perform the control of the pressure-limiting valve 44 and for the height of the volume current to be set by control valve 22 by means of additional set quantity.

In order for the hydraulic piston 12 of the hydraulic cylinder 10 to be able to move, because of the disturbing quantities acting on it, the check valves 42, 64 must each be switched to its open position. Through the electrically controllable pressure-limiting valve 44, the pressure that is to act on the head-end of the hydraulic cylinder 10 is regulated by the control unit 54 according to needs pressure.

If the control unit 54 determines that the boom has dropped too low, the pressure-limiting valve 44 is set to a higher value and control valve 22 is opened, so that the volume current flowing into the head-end of the hydraulic cylinder 10 is increased and the hydraulic piston rod 52 is driven out.

If the control unit 54 determines that the boom has been raised too high, the pressure-limiting valve 44 is set to a lower value, so that the pressure on the head-end of the hydraulic cylinder 10 is reduced and the hydraulic piston 12 is driven towards the head-end. The hydraulic oil that flows from the head-end of the hydraulic cylinder 10 and the first check valve 42 then flows to the rod-end of the hydraulic cylinder 10 and from there through the second check valve 64 to the hydraulic oil tank 28.

In case of an impact that allows the hydraulic piston rod 52 to be driven in, hydraulic oil is forced out from the head-end of the hydraulic cylinder 10 by the hydraulic piston 12 and flows through the pressure-limiting valve 44 and the check valves 42, 64. Because of the oil volume forced out, the boom drops down, which is recognized in turn by the control unit 54 as a control difference, whereupon the control unit 54 increases the opening pressure of the pressure-limiting valve 44 and brings control valve 22 to the stroke position, so that a volume current flows to the head-end of the hydraulic cylinder 10, whereby the set quantity is determined by the control unit 54 according to the control difference. Because of the increase in the opening pressure and the volume current flowing from control valve 22, the boom is lifted up again until the control difference is again zero or has been reduced to a threshold value that can be set in advance. In this case it is conceivable that, in order to speed up the raising, check valve 42 is closed, so that no hydraulic oil can flow out from the head-end of the hydraulic cylinder 10 to the hydraulic tank 28. This raising of the boom is recognized by the control unit 54 as a control difference, and control valve 22 is brought to the stroke position so as to cause a volume current that enters the head-end of the hydraulic cylinder 10. Because of the additional volume of hydraulic oil coming in, the boom stays raised, which is still recognized by the control unit 54 as a control difference, whereupon the control unit 54 reduces the opening pressure of the pressure-limiting valve 44, during which the control unit 54 determines the set quantity according to the control difference. The opening pressure of the pressure-limiting valve 44 increases and brings control valve 22 to the stroke position, so that a volume current flows to the head-end of the hydraulic cylinder 10, whereby the set quantity is obtained, the control unit 54 then returns control valve 22 to the closed position. Because of the reduction in the opening pressure, hydraulic oil flows out from the head-end of the hydraulic cylinder 10 through the pressure-limiting valve 44 and the boom drops down until the control difference is again zero or has been reduced to a threshold value that can be set in advance.

It is also conceivable here that after the boom has been raised, the boom can be dropped again, in order to be able to drive the hydraulic cylinder faster, during which the control unit 54 switches control valve 22 to a drop position and closes the check valves 42, 64.

Control valves 22 and check valves 42, 64 are shown as electrically controlled, but they can also be controlled pneumatically, hydraulically, or in another manner.

Another embodiment example is shown in FIG. 4. The difference in comparison to the preceding embodiment example shown in FIG. 3 is in the fact that, as also shown in FIG. 2, a controllable choke 58 is used instead of the controllable pressure-limiting valve 44. The basic working principle remains the same, however. In addition, however, a pressure sensor 66 is arranged on the discharge side of the hydraulic cylinder 10, which is required in order to give an opening signal to the control unit 54 for the check valves 42, 64. Alternatively, other kinds of acceleration devices can be used, with which the loads on the hydraulic cylinder 10 can be measured.

Measurement of the load on the hydraulic cylinder 10 is required in order to determine when the check valves 42, 64 must be opened, since otherwise hydraulic oil can flow out from the head-end of the hydraulic cylinder 10 and the boom can drop down.

If both check valves 42, 64 are open, a particular volume current is set up through the choke 28 according to the choke equation, which current depends on the pressure difference before and behind the choke 58, the cross-section of the opening of the check 58, and on the viscosity of the hydraulic oil. The set quantity for setting the stagnation pressure is determined as in the embodiment example according to FIG. 2.

If the control is activated, the load on the hydraulic cylinder 10 can be measured directly by the pressure sensor 66 or, in the alternative, indirectly by an acceleration sensor. This load is kept together with the original position of the boom as a guide parameter (target value) to be maintained. If the control unit 54 now determines a particular deviation in the hydraulic cylinder load, the control unit 54 opens control valve 22 and the two check valves 42, 64, so a volume current can flow. This volume current generates a stagnation pressure on the head-end of the hydraulic cylinder 10 by choking in such a way that the load is transmitted to the hydraulic cylinder 10.

After the valves 42, 64 are opened, the control unit 54 determines one or more set quantities in case a deviation from the rule exists, in order to perform the setting of the cross-section of the opening of the choke 58 and/or the change in the volume current of control valve 22.

If the control unit 54 determines that the boom has dropped too low after the opening of control valve 22 and the check valves 42, 64, the cross-section of the opening of the choke 58 is set to a smaller value, so that the stagnation pressure on the discharge side of the hydraulic cylinder 10 is increased and the hydraulic piston rod 52 is driven out. If the control unit 54 determines that the boom has been raised too high after the opening of control valve 22 and the check valves 42, 64, the cross-section of the opening of the choke 58 is set to a larger value, so that the stagnation pressure on the head-end of the hydraulic cylinder 10 is reduced and the hydraulic piston rod 52 is retracted. The hydraulic oil that flows from the head-end of the hydraulic cylinder 10 then flows through the choke 58 and the check valve 42 on the rod-end of the hydraulic cylinder and from there through the check valve 64 to the hydraulic tank 28.

In case of an impact that exerts a force on the chamber 14 defined at the head-end of cylinder 10, the control unit 54 generates a set quantity on the basis of the opening signal through the pressure sensor 66, which leads to the opening of control valve 22 and the check valves 42, 64, so that the hydraulic piston rod 52 can be driven in. The hydraulic oil from the head-end of the hydraulic cylinder 10 is forced out by the hydraulic piston 12 and flows through the choke 58 and the check valves 42, 64. Because of the volume of hydraulic oil forced out, the boom drops down, which is recognized in turn by the regulator as a control difference, whereupon the control unit 54 reduces the cross-section of the opening of the choke 58. Because of the increase in the stagnation pressure resulting therefrom and the volume current flowing from control valve 22, the boom is again raised until the control difference has again been reduced to zero or to a threshold value that can be set in advance.

It is conceivable in this case that check valve 42 is closed to speed up the lifting, so that no hydraulic oil can flow to the tank from the discharge side of the hydraulic cylinder 10.

In case of an impact that exerts a force on the chamber 16 on the rod-end of the cylinder 10, the control unit 54 generates a set quantity on the basis of the opening signal through the pressure sensor 66, which leads o the opening of control valve 22 and the check valves 42, 64, so that the hydraulic piston rod 12 can be driven toward the rod-end. By moving the hydraulic piston 12, the hydraulic oil on the rod-end of the hydraulic cylinder 10 is released and a volume enlargement of the chamber 14 on the head-end takes place, since oil is forced out of the chamber 16 on the rod-end to the hydraulic tank 28. This lifting of the boom is recognized by the control unit 54 as a control difference and control valve 22 opens in order to fill the volume enlargement that arises on the head-end of the hydraulic cylinder 10. Because of the volume of hydraulic oil coming in, the boom stays raised, which is still recognized by the control unit 54 as a control difference, whereupon the control unit enlarges the cross-section of the opening of the choke 58. In addition, the control unit 54 closes control valve 22 again. Because of the enlargement of the cross-section of the opening of the choke 58, hydraulic oil flows out from the head-end of the hydraulic cylinder 10 through the choke 58 and the boom drops down until the control difference has again been reduced to zero or to a threshold value that can be set in advance.

It is also conceivable to reverse the direction of the volume-current flow from control valve 22 and close the check valves 42, 64 in order to accelerate the dropping of the boom after the boom had been raised.

Figure 5:
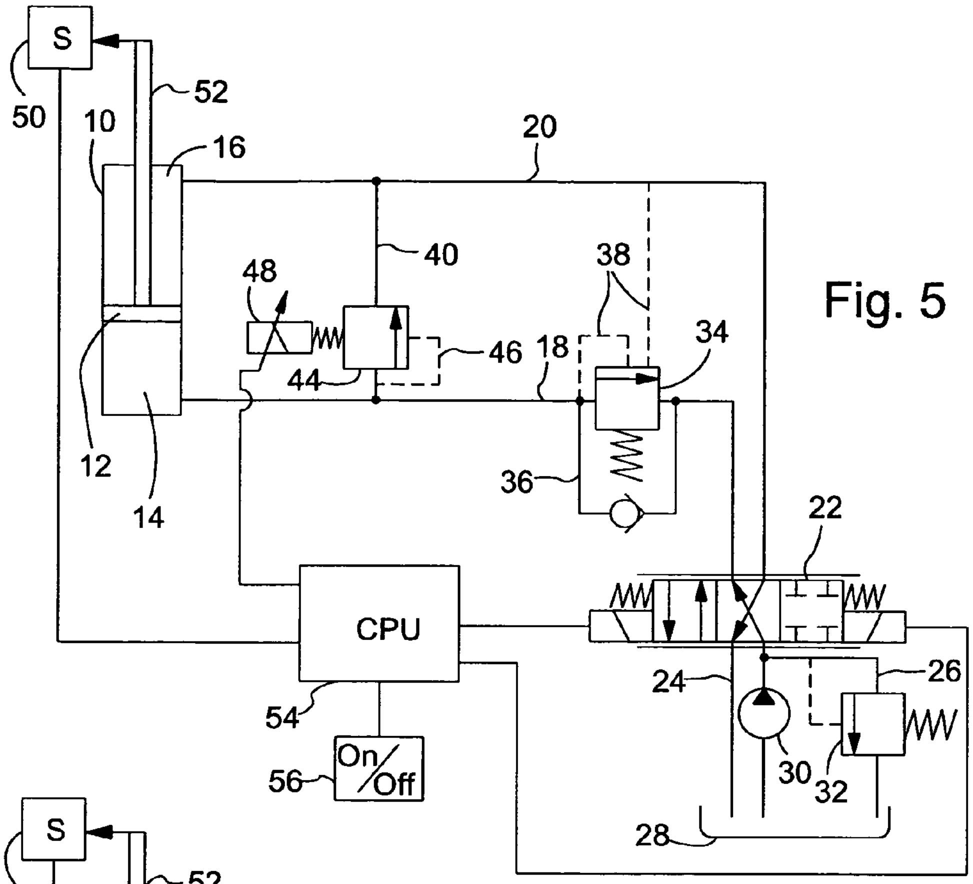
FIG. 5 shows a hydraulic circuit plan similar to that illustrated in FIG. 1, but omitting a check valve.
Figure 6:
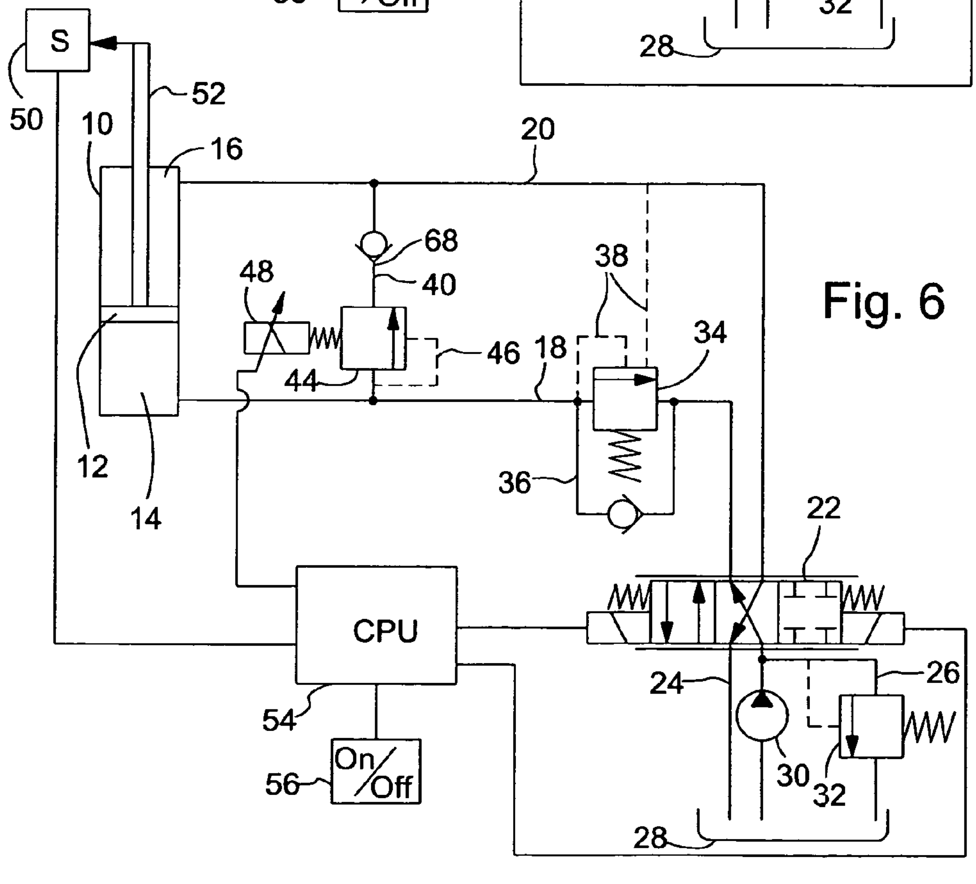
FIG. 6 shows a hydraulic circuit plan similar to that illustrated in FIG. 1, but with a non-return valve instead of the check valve.
Figure 7:
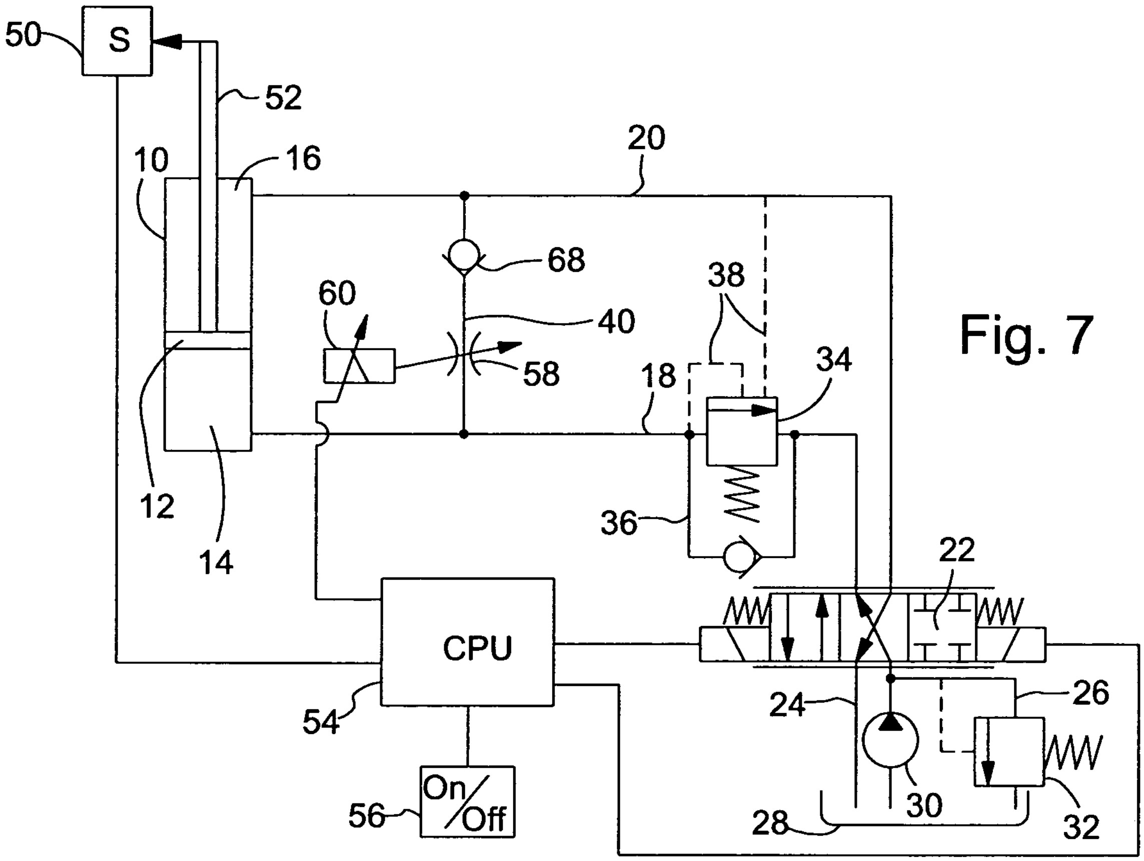
FIG. 7 shows a hydraulic circuit plan similar to that illustrated in FIG. 2, but with a non-return valve instead of the check valve.

FIGS. 5 through 7 show simplified embodiment examples of the invention, where essentially correspond to the embodiment examples described in FIGS. 1 and 2, except that the first check valve is omitted.

FIG. 5 shows the simplest of the embodiment examples shown, in which, in comparison to FIG. 1, the first check valve 42 is dispensed with. The pressure-limiting valve 44 is then controlled to a correspondingly high pressure-limiting value when the suspension is not activated, so that the connecting line 40 is essentially closed, similar to how a check valve 42 would work. Only when the suspension is activated is the pressure-limiting valve 33 controlled down by the control unit 54 to a control range that corresponds essentially to the functional principle of FIG. 1. Otherwise, the procedure is similar to the functional principle already described for the embodiment example in FIG. 1.

In order to provide a leak-free sealing in the embodiment example presented in FIG. 5, in the direction of the chamber 14 defined at the head-end of the hydraulic cylinder 10, a non-return valve 68 can be used advantageously, as shown in FIG. 6.

Another embodiment example is presented in FIG. 7, in which, in comparison to FIG. 2, the first check valve 42 is replaced by a non-return valve 68. This embodiment example represents, in comparison to the embodiment example according to FIG. 2, a variant with which the switching process for the first check valve 42 can be dispensed with. The choke 58 shown in FIG. 7 is then controlled or closed correspondingly, when the suspension is not activated, on a correspondingly small pass-through cross-section that generates a high back stagnation pressure, so that the pass-through cross-section of the choke essentially amounts to zero and connecting line 40 is essentially closed, similar to how a check valve 42 would work. Only when the suspension is activated is the choke 58 controlled or opened correspondingly to a control range with a larger pass-through cross-section that generates a lower back stagnation pressure corresponding to the functional principle in FIG. 2. Otherwise, the process is similar to the functional principle already described from the embodiment example in FIG. 2. The non-return valve 68 is necessary here, in order to avoid an inflow in the direction of the chamber 14 on the head-end side of the piston 12 through connecting line 40 when the suspension is activated, since a choke 58 or diaphragm can be passed through in both directions. In addition, at the choke 58, when the suspension is deactivated, leakages can also appear in the direction of the chamber 14, which can be avoided by the non-return valve 68. The non-return valve 68 thus also contributes to a correct functioning of the load-holding valve 34. In a hydraulic suspension without a load-holding valve 34, the non-return valve 68 could be omitted, since then hydraulic oil can always flow out from the chamber 14.

Figure 8:
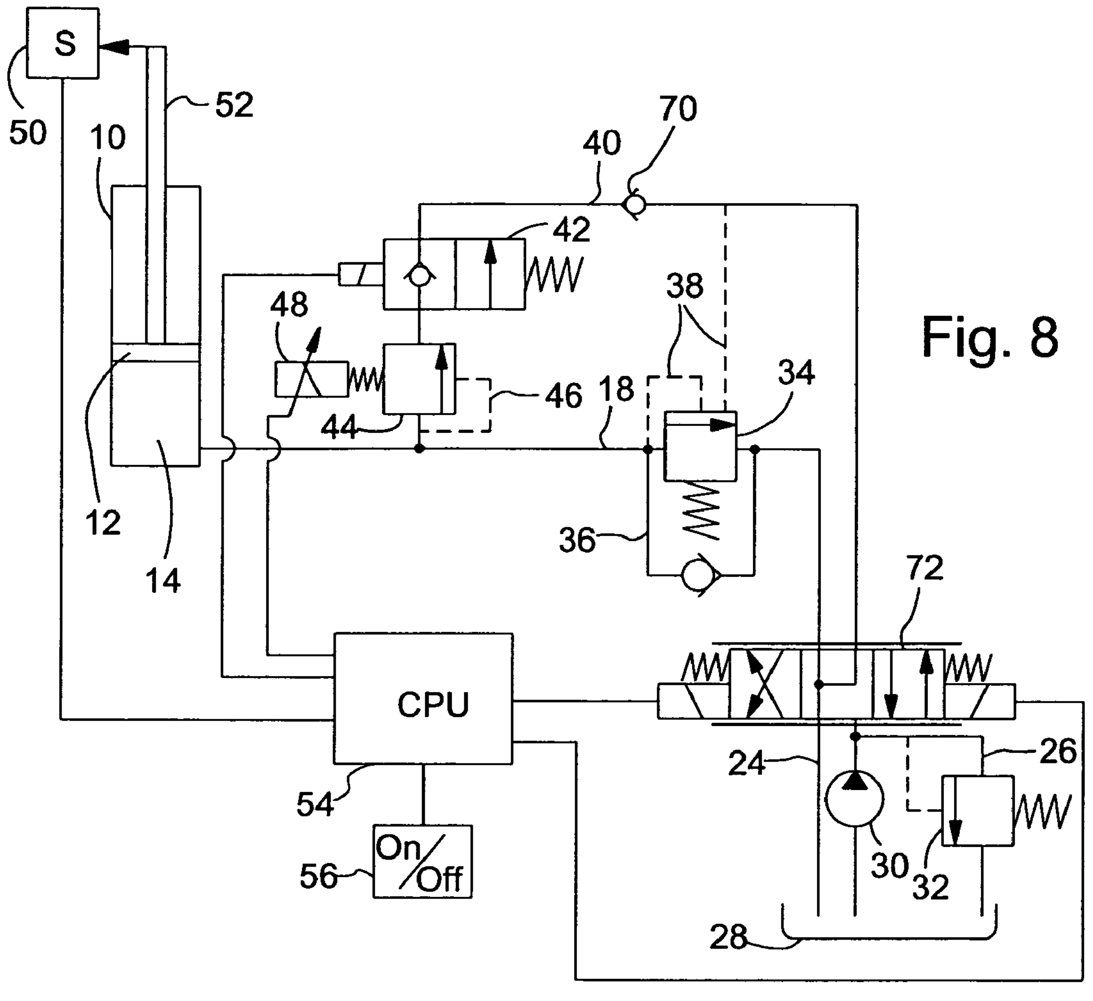
FIG. 8 shows a hydraulic circuit plan, according to the invention, which includes a constantly flowing volume current and a controllable pressure-limiting valve for a single-acting hydraulic cylinder.
Figure 9:
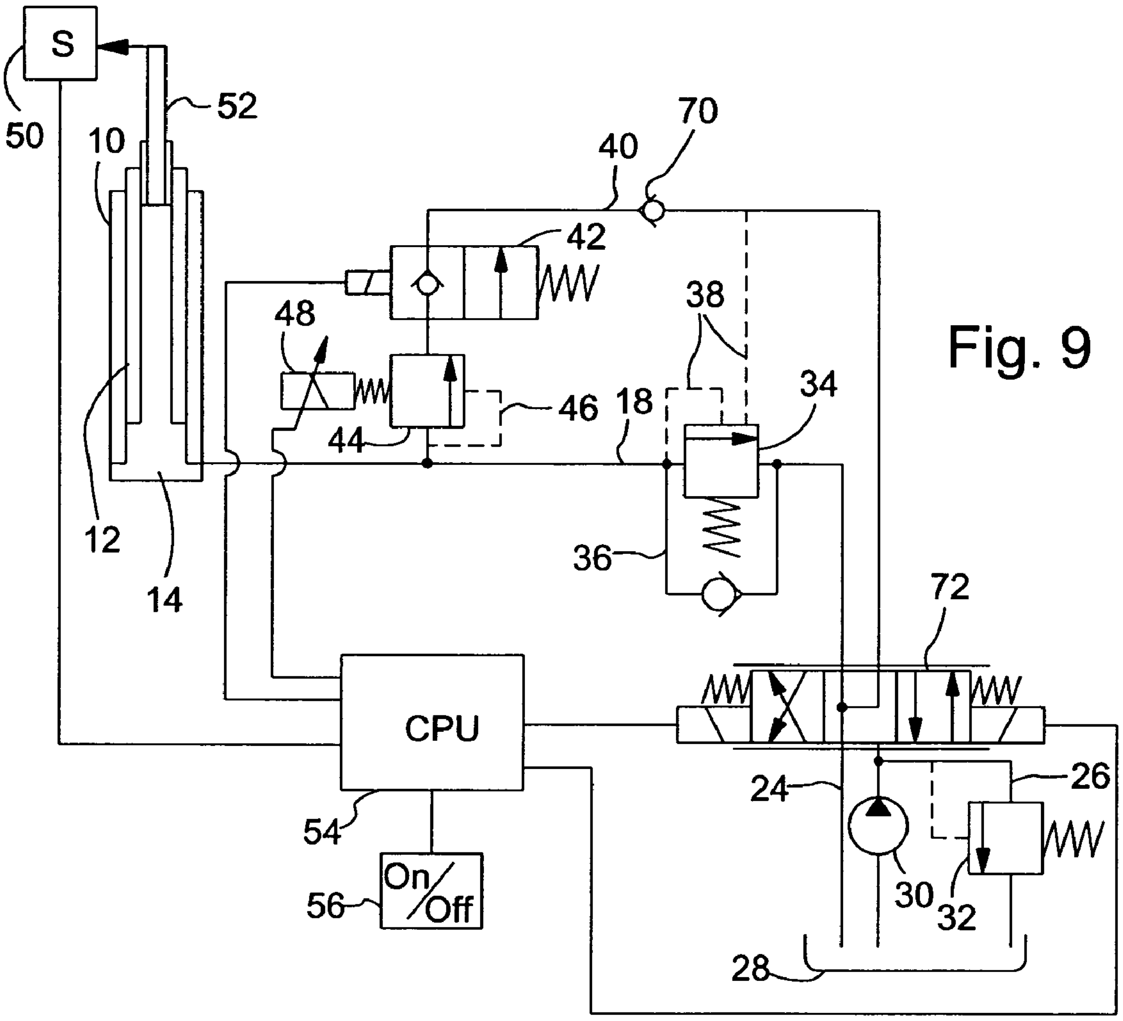
FIG. 9 shows a hydraulic circuit plan similar to that illustrated in FIG. 8, but applied for use with a telescopic cylinder.

FIGS. 8 and 9 show embodiment examples for a single-acting stroke cylinder 10. In FIG. 8, it should be recognized that the hydraulic circuit from FIG. 1 is essentially involved. Since a single-acting hydraulic cylinder 10 is used here, the hydraulic line 20 is omitted, so that connecting line 40 now connects the chamber 14 of the hydraulic cylinder 10 to the hydraulic oil tank 28. A control valve 72 is constructed in this case in such a way that in the drop position it connects connecting line 40 to the hydraulic oil pump 30 and the hydraulic line 18 to the hydraulic oil tank 28. In order to lower the hydraulic cylinder 10, a non-return valve 70 is envisioned in connecting line 40 behind the connection to the control line 38. The hydraulic cylinder 10 can be lowered only by the non-return valve 70. For this, control valve 72 is placed in the drop position, whereby the hydraulic oil pump 30 generates an opening pressure in the control line 38 because of the closing non-return valve 70 in the pumping direction, so that the load-holding valve 34 opens and the hydraulic oil can flow out from chamber 14 through the hydraulic line 18 into the hydraulic oil tank 28. In addition, the check valve 42 in the embodiment with a single-acting stroke cylinder 10 is adjusted, since here only a hydraulic oil flow in one direction is to be expected. Similar changes can also be made in the hydraulic circuits shown in FIGS. 2 and 5 though 7, so that it is possible for a single-acting hydraulic cylinder 10 to be substituted for the double-acting cylinders disclosed in these embodiments.

As an example, the way in which a suspension for a single-acting hydraulic cylinder 10 operates will be described in the following with reference to the embodiment examples presented in FIGS. 8 and 9. In contrast to FIG. 8, a telescopic cylinder is arranged in FIG. 9 as a hydraulic cylinder 10. The way in which the suspension functions is not affected by this, however. With reference to FIG. 9, it should only be indicated a hydraulic cylinder 10 working like a telescope can also be used.

According to FIGS. 8 and 9, the hydraulically active suspension for a single-acting hydraulic cylinder 10 can be realized both with a constantly flowing volume current and with a needs-controlled volume current. In a constantly flowing volume current, the control unit 54 is activated by the switching device 56, whereby the control unit 54 opens the check valve 42 and control valve 72 is switched to the stroke position, in which the hydraulic oil pump 30 is connected to the hydraulic line 18 at the head-end of the cylinder 10. The hydraulic oil pump 30 supplies the hydraulic oil through control valve 72 and through the load-holding valve 34 to the hydraulic cylinder 10 of the boom. There, a certain pressure builds up, which is set by the controllable pressure-limiting valve 44. As soon as a pressure balance has been set, the hydraulic piston 12 assumes a certain position, whereby excess hydraulic oil supplied by the hydraulic oil pump 30 flows into connecting line 40 through the pressure-liming valve 44 and through the first check valve 42 and through the non-return valve 70 to the hydraulic tank 28. If, with an activated suspension (check valve 42 is open) the hydraulic piston 12 now comes to spring in, the control unit 54 generates a control signal for the pressure-limiting valve 44 on the basis of the signal from the position sensor 50, which then lets the pressure in the hydraulic line 18 at the head-end of the cylinder 10 rise until the hydraulic piston 12 has again assumed its initial position.

The basic manner of functioning accordingly corresponds, also with a single-acting hydraulic cylinder 10, whether constructed as a conventional or a telescoping cylinder, to the principle described in FIG. 1, so that the pressure in the chamber 14 of the single-acting hydraulic cylinder 10 is controlled by the fact that a certain inflow of hydraulic oil can flow from the chamber 14 to the hydraulic tank 28 through connecting line 40. For further description of the way in which this functions, especially in case impacts appear, reference is made here to the preceding explanations, especially to that relating to FIG. 1.

In an active suspension with a needs-controlled volume current, control valve 72 is switched to its middle position, after the hydraulic cylinder 10 is raised or lowered (through the stroke or drop position of control valve 72), in which both hydraulic line 18 and connecting line 40 are connected to the hydraulic-oil tank 28. In this position, no hydraulic oil flows from the hydraulic oil pump 30 through lines 18 and 40. If a pressure increase now comes into the chamber 14, with activated suspension (check valve 42 is open), for example by impacts, that is connected to the a lowering or raising of the hydraulic piston rod 52, then this movement is captured by the position sensor 50. The control unit 54 records the change and generates a control signal, through which control valve 72 is switched to its stroke position. A new extension of the hydraulic piston rod 52 follows, until the initial position of the hydraulic piston rod 52 is reached again. As soon as the initial position has been reached, the control unit 54 switches control valve 72 again to the middle position.

Although the invention has only been described with reference to a few embodiment examples, many alternatives, modifications, and variants of various kinds will be included for the expert in light of the foregoing description that fall under the present invention.

Having described the preferred embodiment, it will become apparent that various modifications can be made without departing from the scope of the invention as defined in the accompanying claims.

What is claimed is:

1. In a hydraulic suspension, for a boom of a loading vehicle, including at least one hydraulic cylinder having at least one chamber containing a piston coupled to a piston rod, a pump, a hydraulic oil tank, a direction control valve, a supply/return line coupling said control valve to said at least one chamber, a drain line coupling said control valve to said oil tank and a supply line coupling said control valve to said pump, and said control valve being selectively operable for either creating a connection between said pump and said chamber by way of said supply/return line or creating a connection between said oil tank and said chamber by way of said supply/return line, the improvement comprising: said hydraulic suspension further including a control unit; a sensor coupled for sensing the position of said piston rod of said the hydraulic cylinder and being operable for generating a signal representing a sensed position of said piston rod; said sensor being coupled to said control unit for conveying said generated signal to said control unit; and a variable pressure-limiting unit coupled to said supply/return line and to said control unit and being controlled as a function of said signal generated by said sensor.

2. The hydraulic suspension, as defined in claim 1, and further including a connecting line coupled between said pressure-limiting unit and said tank for conveying fluid to said tank from said chamber when said pressure-limiting unit is operating to reduce the pressure in said chamber.

3. The hydraulic suspension, as defined in claim 1, wherein said hydraulic cylinder is a double-acting cylinder including a piston joined to a piston rod, with said chamber being a head-end chamber located at one side of said piston, and with a rod-end chamber being located at another side of said piston; a second supply/return line being connected between said control valve and said rod-end chamber; a second connecting line coupling said head-end and rod-end chambers together by way of at least said pressure-limiting unit.

4. The hydraulic suspension, as defined in claim 3, and further including a non-return valve contained in said connecting line upstream from said pressure-limiting unit for preventing flow in the direction of said head-end chamber from said rod-end chamber.

5. The hydraulic suspension, as defined in claim 3, wherein said direction control valve has a closed position wherein it blocks flow to said head-end and rod-end chambers from said pump, and to said tank from said head-end and rod-end chambers.

6. The hydraulic suspension, as defined in claim 1, wherein, in addition to said pressure-limiting unit said connecting line includes a check valve located downstream of said pressure-limiting unit, with said check valve being coupled to said control unit; and said control unit operating to effect movement of said check valve between a normally closed position, wherein said suspension is deactivated, and an open position, wherein said suspension is activated.

7. The hydraulic suspension, as defined in claim 1, wherein said pressure-limiting unit is a controllable pressure-limiting valve.

8. The hydraulic suspension, as defined in claim 1, wherein said pressure-limiting unit is an adjustable choke.

9. The hydraulic suspension, as defined in claim 1, and further including a load-holding valve located in the supply/return line.

10. The hydraulic suspension, as defined in claim 1, wherein a pressure-limiting line is coupled between said pump and said tank at a location between said pump and said direction control valve; and said pressure-limiting line containing a pressure-limiting valve.

11. The hydraulic suspension, as defined in claim 1, wherein said control unit records a target-value signal received from said position sensor which represents the starting position of a piston rod of said hydraulic cylinder when the suspension is activated and thereafter compares this signal to a current position signal also received from said position sensor; a position difference threshold value is preset in said control unit and when the difference reaches said position threshold value said control unit controls said controllable pressure-limiting unit as a function of a difference signal resulting from comparing said target signal and said current position signal.

12. The hydraulic suspension, as defined in claim 1, wherein said hydraulic cylinder is double-acting and includes a piston rod joined to a piston, with said chamber being a head-end chamber located at one side of said piston, and with a rod-end chamber being located at an opposite side of said piston; said connecting line being a second supply/return line coupled between said control valve and said rod-end chamber; a second connecting line connected between said rod-end chamber and said tank; a controllable first check valve being coupled between said pressure-limiting unit and said second supply/return line; a controllable second check valve being coupled between said second supply/return line and said second connecting line; and said controllable first and second check valves being coupled to said control unit and operated to respective open positions in response to conditions requiring adjustment of the piston rod.

13. The hydraulic suspension, as defined in claim 1, and further including a load sensor for sensing the load applied to said cylinder; said load sensor being coupled to said control unit, which operates in response to the sensed load for effecting a change in a setting of said pressure-limiting unit.

* * * * *